United States Patent
Sexton et al.

(10) Patent No.: US 6,956,839 B2
(45) Date of Patent: *Oct. 18, 2005

(54) METHOD, AND ASSOCIATED APPARATUS, FOR COMMUNICATING PACKET DATA IN A RADIO COMMUNICATION SYSTEM

(75) Inventors: Thomas A. Sexton, Fort Worth, TX (US); George Fry, Coppell, TX (US)

(73) Assignee: Nokia Corporation, Espoo (FI)

(*) Notice: Subject to any disclaimer, the term of this patent is extended or adjusted under 35 U.S.C. 154(b) by 470 days.

This patent is subject to a terminal disclaimer.

(21) Appl. No.: 10/133,719

(22) Filed: Apr. 26, 2002

(65) Prior Publication Data

US 2002/0159433 A1 Oct. 31, 2002

Related U.S. Application Data

(63) Continuation of application No. 09/259,844, filed on Mar. 1, 1999, now Pat. No. 6,614,772.

(51) Int. Cl.$^7$ .............................. H04B 7/216; H04J 3/24
(52) U.S. Cl. ....................... 370/335; 370/342; 370/349
(58) Field of Search ............................... 370/329, 335, 370/342, 349, 395.52, 401, 441, 338, 421; 455/433, 435.1–435.3, 450, 509, 456, 515, 432, 435

(56) References Cited

U.S. PATENT DOCUMENTS

| 5,257,399 A | 10/1993 | Kallin et al. ................ 455/33.1 |
| 5,884,172 A | 3/1999 | Sawyer ........................ 455/435 |
| 5,926,764 A | 7/1999 | Sarpola et al. .............. 455/450 |
| 6,069,882 A | 5/2000 | Zellner et al. .............. 370/329 |
| 6,169,731 B1 | 1/2001 | Stewart et al. .............. 370/332 |
| 6,169,898 B1 | 1/2001 | Hsu et al. ................... 455/432 |

*Primary Examiner*—Ricky Ngo
*Assistant Examiner*—Soon D. Hyun

(57) ABSTRACT

Apparatus, and an associated method, for a radio, such as cellular, communication system to facilitate communications between a mobile station and the network infrastructure. When the mobile station registers in the communication system, a dedicated reverse-link channel is allocated to facilitate communications of packet data between the mobile station and the network infrastructure. By providing dedicated channels, the mobile station becomes functionally connected to the network infrastructure and are analogous to a hard wired connection of a computer in a local area network.

19 Claims, 5 Drawing Sheets

METHOD, AND ASSOCIATED APPARATUS, FOR COMMUNICATING PACKET DATA IN A RADIO COMMUNICATION SYSTEM

The present application is a continuation of U.S. patent application Ser. No. 09/259,844, filed on Mar. 1, 1999, now U.S. Pat. No. 6,614,772.

The present invention relates generally to the communication of packet data in a radio communication system, such as a CDMA2000 cellular communication system. More particularly, the present invention relates to a method, and an associated apparatus, by which to communicate packet, and other, data between a mobile station and network infrastructure upon a radio air interface formed therebetween. Operation of an embodiment of the present invention provides a dedicated, reverse-link channel which functionally connects the mobile station to the network infrastructure in a manner analogous to a hardwired connection of a computer in a LAN (local area network).

BACKGROUND OF THE INVENTION

Advancements in digital telephony techniques have permitted the development, implementation, and widespread usage of multi-user communication systems. Use of a digital communication system in which digital techniques are utilized is advantageous, inter alia, as the communication capacity of a digital communication system is typically greater than the capacity of a corresponding analog system. Error correction of signals transmitted during operation of such a system can also be improved.

A cellular communication system is exemplary of a communication system which has been made possible as a result of such advancements. A cellular communication system permits communications to be effectuated with a mobile station by way of a radio channel, thereby obviating the need for a wireline connection to form a communication channel between a sending and a receiving station. Through use of a cellular communication system, effectuation of communications is possible at locations at which the use of fixed or hard-wired connections would be inconvenient or impractical, such as in a motor vehicle. Cellular communication systems have been implemented using various communication schemes. A CDMA (Code-Division, Multiple-Access) cellular communication system is an exemplary communication system, implemented utilizing code-division techniques.

Some cellular communication systems provide for the transmission of packet data to and from a mobile station. Information which is to be transmitted is formatted into discrete packets of data, and, once formatted, the packets are transmitted upon a communication channel. In a CDMA communication scheme, for instance, a packet channel is assigned by allocating a code, by which the packets of data are encoded. Once encoded, the packets are transmitted by a transmitting station. And, once received at a receiving station, the packets of data are decoded.

While a circuit-switched channel can be formed upon which to effectuate communication of the packet data between the mobile station and the network infrastructure, such allocation would obviate a significant advantage of packet data communications. That is to say, when information to be communicated is formatted into packets of data, a shared channel can be utilized. Information to be communicated pursuant to more than one data service, or pursuant to more than one sending and receiving station pair, can share a single communication channel. Because of the shared nature of communication transmission upon a shared channel, rather than a circuit-switched channel, the communication capacity of communications in a radio communication system can be increased. Conventionally, packet data applications have been carried out on dedicated radio channels, such as to effectuate SMS (short message service) communications in, for example, a GSM (Global System for Mobile communications) communication system or in an active state pursuant to which a mobile state is operable in a CDMA2000 system.

Also, when such a channel is allocated and deployed, significant amounts of build-up and tear-down overhead is required for its effectuation. Therefore, in addition to the communication capacity limitations associated with the allocation of a circuit-switched channel to communicate the packet data, the increased overhead associated with the deployment of the circuit-switched channel is also disadvantageous.

Increased processing capabilities have permitted the implementation of new types of data services to be effectuated, such as multi-media services in which more than one communication-type, e.g., both voice and non-voice information, is communicated. Communication of the more than one data service also presents unique problems requiring resolution when the data services are to be effectuated by way of a radio link.

A manner by which to more efficiently communicate packet data to effectuate one or more data services in a radio communication system would therefore be advantageous.

It is in light of this background information related to communications in a radio communication system that the significant improvements of the present invention have evolved.

SUMMARY OF THE INVENTION

The present invention, accordingly, advantageously provides a method, and an associated apparatus, by which to better effectuate communications between a mobile station and the network infrastructure of a radio communication system, such as a cellular communication system.

When data is to be communicated by the mobile station to the network infrastructure, a dedicated reverse link channel is allocated for the transmission of such packet data. The dedicated channel becomes always-assigned to the mobile station, thereby to provide a manner by which to rapidly complete effectuation of the communication of the packet data in a highly reliable manner. The dedicated reverse link channel functionally connects the mobile station to the network infrastructure in a manner analogous to the hard-wired connection of a computer in a local area network.

In one aspect of the present invention, a physical layer is provided which includes a forward flow channel and the always-assigned reverse flow channel. The forward flow channel is a broadcast, forward link channel upon which both paging system and also control messages are broadcast in a point-to-multipoint manner. The always-assigned reverse flow channel is used upon which to transmit packet data as well as for the transmission of pilot signals which carry registration messages, and control messages. By defining such channels, a mobile station is, in effect, in constant contact with the network infrastructure.

Because of the always-assigned nature of the reverse flow channel, and the data and messages transmitted thereon, such data and messages are further utilized by the network infrastructure for purposes of locational positioning of the mobile station, even when the mobile station is not otherwise operated in an active call state.

In another aspect of the present invention, a new mobile station architecture is provided. In addition to the improvements to a physical layer which includes the aforementioned forward and reverse flow channels, a packet data layer (PDL) is provided. The PDL is layered between the physical layer and an IP (Internet Protocol) layer operable in a conventional manner, to form datagrams, formed of both header and payload information. The PDL is operable to break the datagrams into smaller units for transmission over the air interface upon the reverse flow channel. The IP layer runs directly on top of the PDL, which in turn runs on top of the physical layer, such as a CDMA2000 physical layer.

In another aspect of the present invention, multi-tasking coordination is provided. That is to say, a multi-tasking entity is provided which examines each active, or recently active, data service of a mobile station-network infrastructure connection. Responsive to such examination, channel allocation is provided to ensure effectuation of the data services in an efficient manner. The common forward channel is defined upon which system-loading, cost information, and mobile station-specific, instantaneous allocation of resource information is broadcast.

In yet another aspect of the present invention, a layering scheme is provided which separates instantaneous network routing and channel resource information from data services while also allowing the data services to function to their requested levels of performance. Data bearers are thereby separated from their associated applications.

In a further aspect of the present invention, a manner is provided by which to better optimize use of the IS-95B data burst and active state packet data available in the proposed CDMA2000 system. User QOS (Quality of Service) requirements and system radio communication capacity is better maximized. Short data bursts are permitted when the mobile station is operated in an intermediate state in addition to the active and dormant states. A determination is made of the length of a user data burst or transaction, the delay which is tolerated by the application, and the error or failure rate tolerated by the application. Responsive to such determination, a manner by which to transmit the data is provided.

Thereby, through operation of various embodiments of the present invention, packet data is communicated from a mobile station to network infrastructure of a radio communication system in a more efficient manner.

In these and other aspects, therefore, a method and an associated apparatus is provided in a radio communication system by which to communicate packet data at a mobile station to network infrastructure of the radio communication system. The mobile station is registered with the network infrastructure at least when the mobile station is initially positioned in a selected registration zone defined in the radio communication system. Responsive to the registration, a dedicated multi-purpose reverse link channel is assigned upon which at least to communicate packet data at the mobile station to the network infrastructure.

A more complete appreciation of the present invention and the scope thereof can be obtained from the accompanying drawings which are briefly summarized below, the following detailed description of the presently preferred embodiment of the invention, and the appended claims.

DETAILED DESCRIPTION OF THE PREFERRED EMBODIMENT

Figure 1:
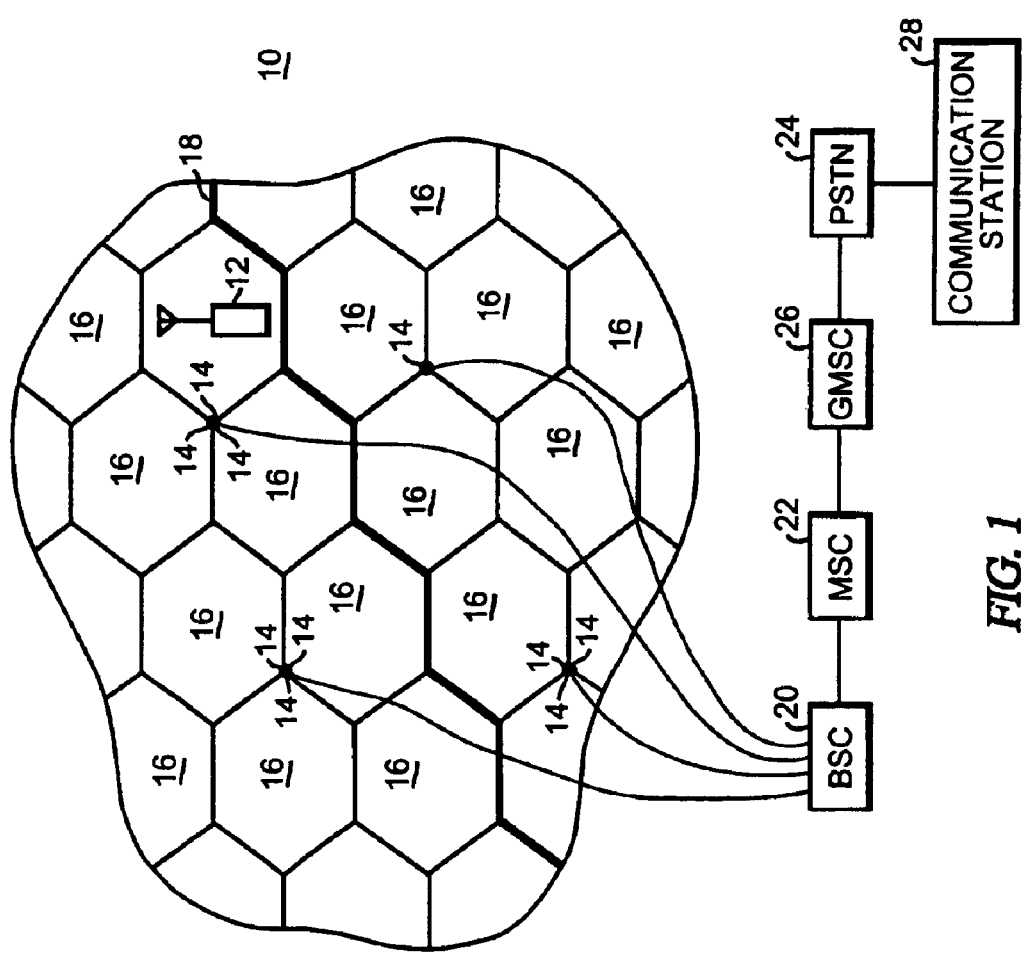
FIG. 1 illustrates a representation of portion of a cellular communication system at which an exemplary embodiment of the present invention is operable.

Turning first to FIG. 1, a portion of a cellular communication system, shown generally at 10, provides for wireless communications with mobile stations, of which the mobile station 12 is exemplary. The system 10 includes a plurality of spaced-apart radio base stations which are positioned throughout a geographical area. The Figure is exemplary, and, in a typical cellular communication system, a large number of radio base stations are positioned throughout the geographical area.

In the implementation shown in the Figure, sets of three radio base stations 14 are co-located. Each of the radio base stations defines a cell 16. A cell is a portion of the geographical area encompassed by the cellular communication system within which communications between the mobile station and a radio base station which defines such cell can be effectuated. Groups of cells 16, typically a large number of cells, together define a registration area. In the illustration of the Figure, portions of two registration areas separated by a boundary 18 are shown. At least when a mobile station passes from one registration area to another registration area, the mobile station is caused to register pursuant to a registration procedure, thereby to identify its position in the cellular communication system. Conventionally, a mobile station also registers during initial powering-on of the mobile station.

In the exemplary illustration in which sets of three radio base stations are co-located, each radio base station defines a sector cell in conventional manner. Groups of the radio base stations 14 are coupled to a BSC (base station controller) 20. A BSC is operable to control operation of the radio base stations coupled thereto. Groups of BSCs are coupled to an MSC (mobile switching center) 22. An MSC is operable, amongst other things, to perform switching operations. The MSC 22 is coupled to a PSTN (public-switched telephonic network) by way of a GMSC (gateway mobile switching center) 26. And, the PSTN is coupled to communication stations, such as the communication station 28.

Operation of an embodiment of the present invention facilitates communication, such as the communication of packet data generated pursuant to a multi-media application by causing the formation of a dedicated, reverse-link channel and a forward link channel between the mobile station and the network infrastructure. The forward link channel forms a broadcast forward link, point-to-multipoint channel, and the reverse channel forms a continuous, reverse-link control channel. In an exemplary implementation, the broadcast forward link channel carries paging messages and also control messages to the mobile station to control packet data communications. And, the continuous reverse-link control channel, in the exemplary implementation carries pilot signals, registration messages, and control messages. By defining these reverse and forward flow channels, the mobile station with which the channels form links, is permitted to remain in constant touch with the network infrastructure in a manner analogous to hard wiring of a computer in a local area network (LAN).

Figure 2:
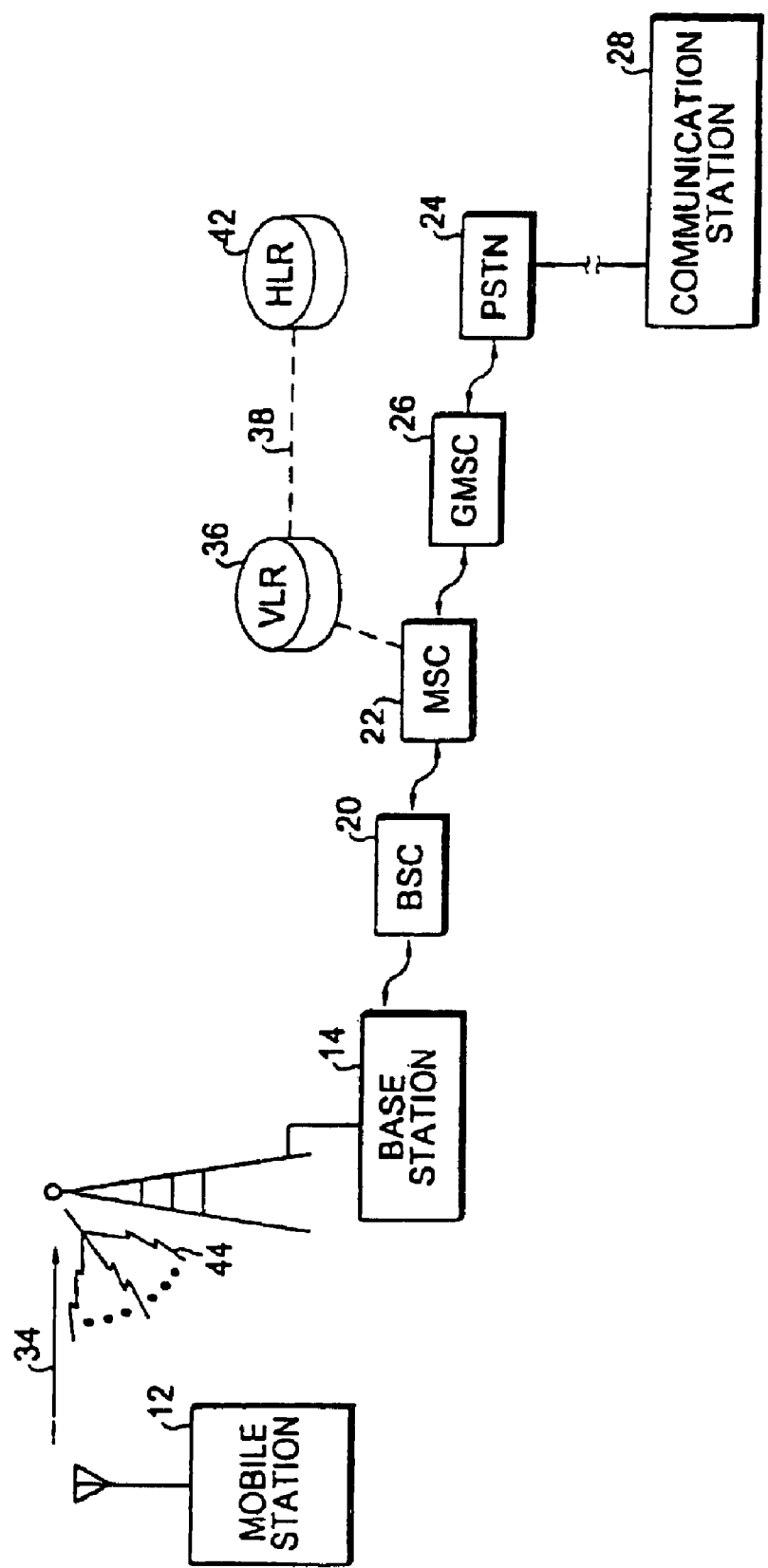
FIG. 2 illustrates a functional block diagram of portions of the network infrastructure of the cellular communication system shown in FIG. 1.

The communication system 10 is again shown in FIG. 2. Here, the mobile station 12 is shown to be coupled to a radio base station 14 by way of a reverse flow channel 34. The radio base station 14 is again shown to be coupled to a base station controller 20 which, in turn, is coupled to an MSC 22. Again, the MSC 22 shown to be coupled to a GMSC 26 which, in turn, is coupled to a PSTN 24. Coupling of the PSTN 24 to a communication station 28 is again also shown in the Figure.

FIG. 2 further illustrates a VLR (visitor location register) 36 located at, or controlled by, the MSC 22. In conventional manner, the VLR 36 is permitted communication, here shown by way of the line 38, with an HLR (home location register) 42. The VLR 36 and HLR 42 are operable in conventional manner to maintain records of the location of the mobile station 12. Additionally, during operation of an embodiment of the present invention, when the mobile station is powered-on, and when the mobile station passes into a new registration area, the mobile station registers with the network infrastructure of the communication system. Through such procedure of registration, information related to the mobile station is stored at the VLR 36. And, responsive to such registration, the reverse flow channel 34 is allocated to the mobile station. A forward flow channel, here forming a point-to-multipoint broadcast channel 44, is also shown in the Figure upon which to broadcast messages, etc. to mobile stations, such as the mobile station 12.

Figure 3:
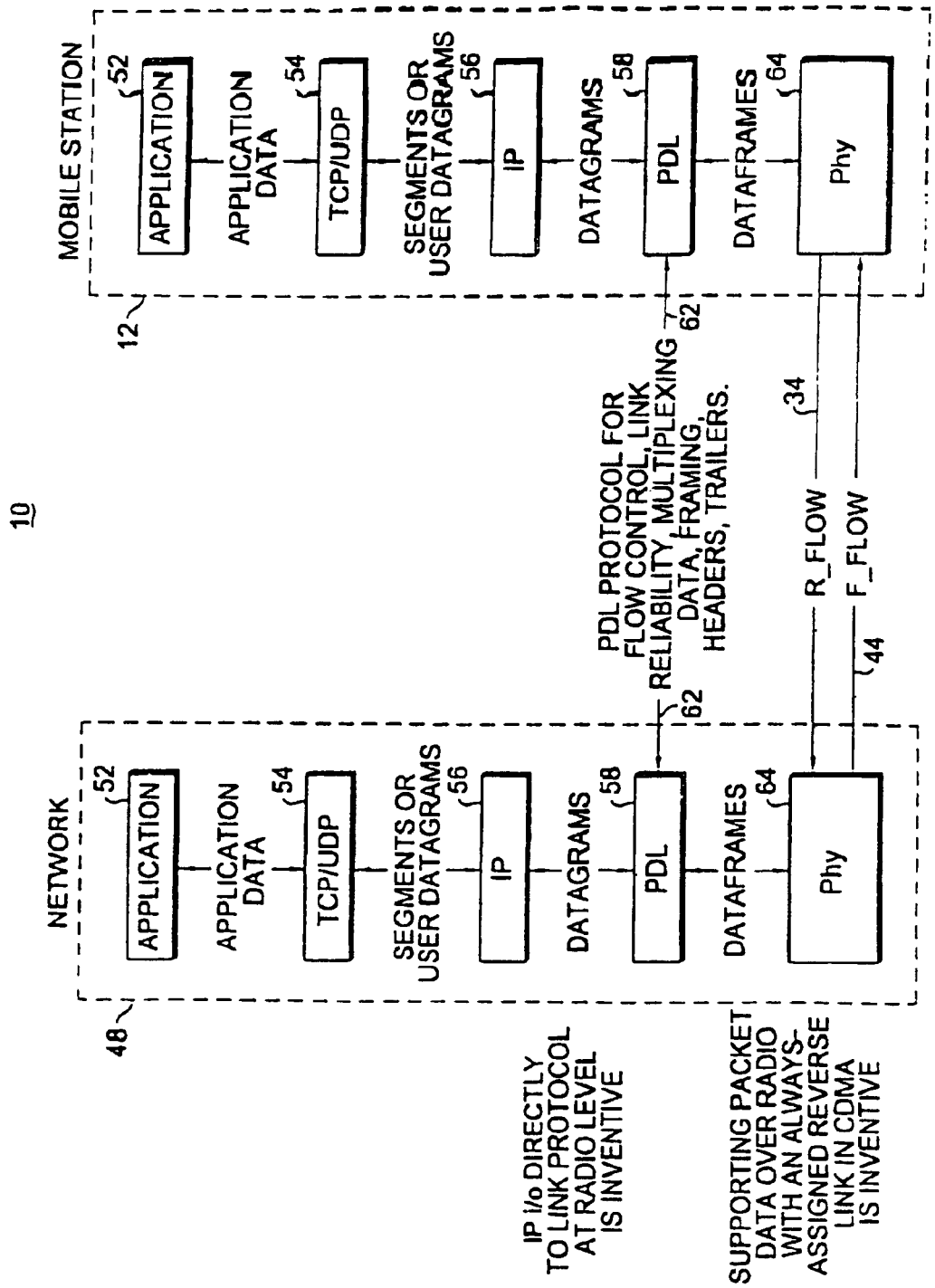
FIG. 3 illustrates another functional block diagram of the communication system shown in FIG. 1.

FIG. 3 illustrates the communication system 10. Here, portions of the system are shown in terms of application layers. And, structure of the mobile station 12 and of the network infrastructure, here shown at 48, are, for purposes of illustration, represented in a side-by-side manner. Applications 52, such as multi-media applications at the mobile station as well as at the network are shown as layers at the mobile station and at the network infrastructure respectively. The applications 52 are run on a TCP/UDP application 54 which is stacked upon an IP layer 56. As shown, application data is passed between the application 52 and the TCP/UDP application layer 54. And, data segments or user datagrams are passed between the TCP/UDP application layers 54 and the IP layers 56.

The IP layers 56 run upon a new, packet data layer (PDL) 58. The packet data layer multiplexes IP processes, configures send and receive windows for flow control by way of an air interface, provides for reliable communications between the mobile station 12 and the network infrastructure 48, and imposes framing, viz., frame headers and trailers on the data. Such functioning is represented by way of the line 62 extending between the network 48 and the mobile station 12. As shown, datagrams are passed between the IP layers 56 and the packet data layers 58. The packet data layer defines a single layer which provides all of the functions previously required to be effectuated by a series of entities which sometimes performed conflicting, redundant, or missing functions.

Frames of data formed by the packet data layers 58 are provided to physical layers 64 in which the reverse flow channel 34, and as described above, is assigned. The forward flow channel 44 is also shown in the Figure to extend between the network infrastructure and the mobile station at the physical layer level.

In operation, the application 52 creates an IP source and destination address and port, the total forming a socket, to the TCP, or UDP, layer 54. The layer 54 forms the data into segments, or user datagrams if the layer 54 is a UDP layer. Such segments of datagrams are passed to the IP layer 56. At the IP layer, a datagram is formed. A datagram includes both a source and destination address, and the datagram is then passed to the PDL 58.

The packet data layer 58 breaks the datagrams provided thereto into units here referred to as data frames, and frames of data are transmitted over the air interface formed between the mobile station and the network. The link destination is, for mobile originated data, the IWF, and the segments of data are numbered and transmitted according to conventional send/receive window rules. Operation of the packet data layer 58 provides a manner by which to interface the IP layer and the physical layer, here the physical layer of a CDMA2000, cellular communication system.

Because the dedicated reverse flow channel 34 is provided to facilitate the effectuation of communications between the mobile station and the network, the mobile station is maintained in apparent-contact with the network in a manner analogous to hard wired connections formed between a computer and a local area network.

Formation of the reverse flow channel also provides the network infrastructure 48 with a constant stream of data which can be used by the network infrastructure to determine the position of the mobile station, even in the event that the mobile station is not operated in an active call state. Also, through operation of an embodiment of the present invention, the reverse flow channel 34 is a power-controlled channel, controlled by messages generated by the network infrastructure and transmitted upon the forward flow channel to the mobile station. In this manner, a forward flow channel is operated in a manner similar to that defined in the CDMA2000 standard, viz., the FCCCH, except that the forward flow channel 44 is dedicated to the reliability and flow-control features of packet data services.

Also, as the forward flow channel and the reverse flow channels 34 are continuous, the packet data layers 58 rely on an acknowledgement (ACK) based exchange of frames of data. In the event that the error interface becomes capacity-limited, flow control can be effectuated by the network infrastructure through the PDL layers, e.g., by simply establishing a zero-link receive window. The packet data layers must assemble received frames into complete IP datagrams prior to forwarding such data to the IP layers. In one implementation, the packet data layer is formed in a PPP implementation.

Thereby, a power-controlled, privately-spread, reverse control channel is provided to the mobile station each time in which the mobile station is registered in a new registration zone. The reverse channel is useful for achieving packet data link reliability, packet data flow control, and multiplexing of services in a CDMA cellular packet service. Geographic positioning, i.e., determination of the physical position of the mobile station, is also facilitated through the continuous transmission of data on the reverse flow channel. Walsh coding, coupled with a forward channel 44 dedicated for the purpose of controlling the reverse channel power of signals generated by the mobile station is also provided for completing message exchanges needed for packet data link reliability, packet data flow control, and multiplexing of services.

Figure 4:
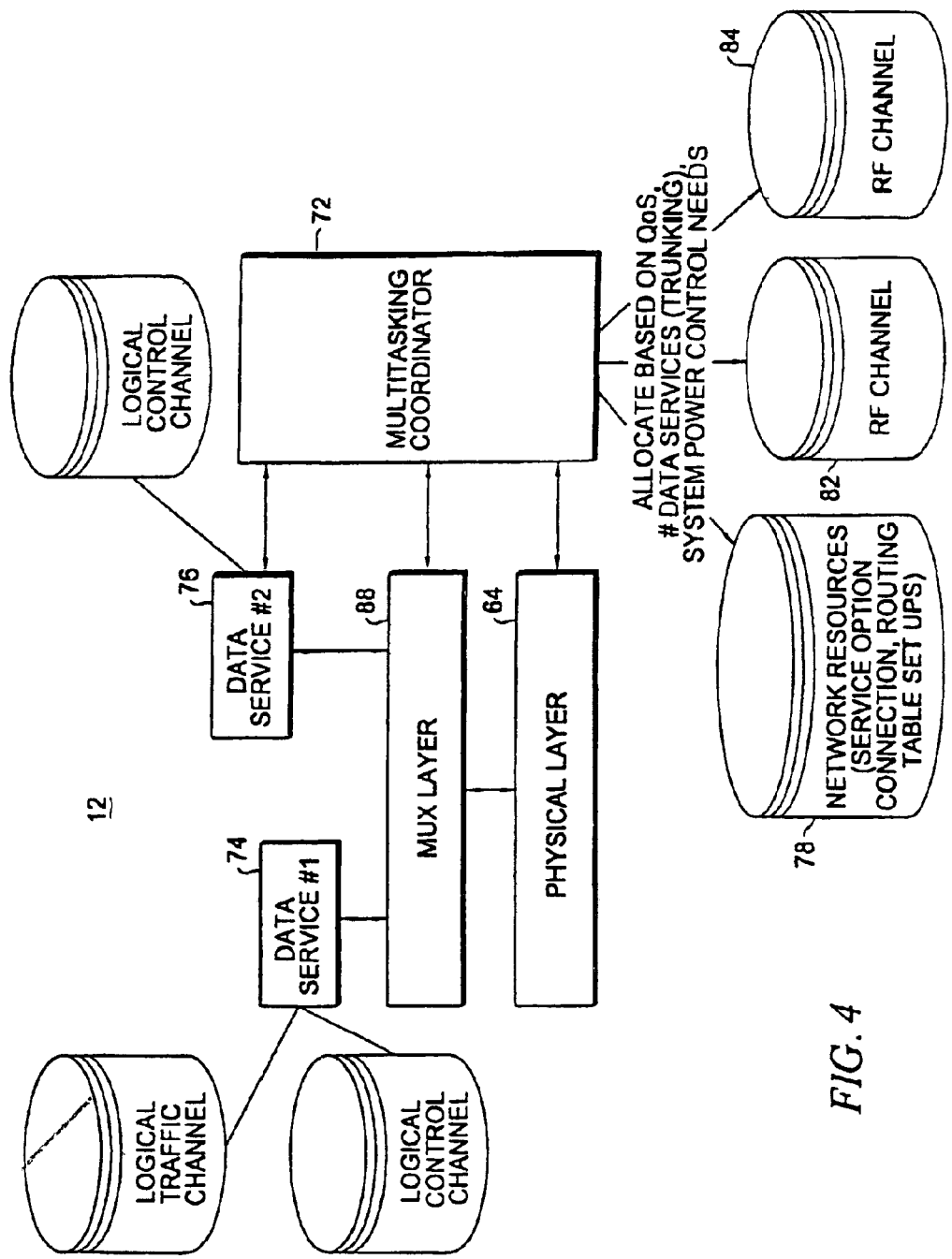
FIG. 4 illustrates a functional block diagram of a portion of the cellular communication system shown in FIG. 1 of a further embodiment of the present invention.

FIG. 4 illustrates the mobile station 12, together with channels upon which data is communicated during operation of a further embodiment of the present invention. In this embodiment, the mobile station is able to support multiple, simultaneous data services, such as required to effectuate a multi-media application. In the exemplary implementation, the mobile station 12 is operable in the manner as previously-described and a reverse flow channel 34 (shown in FIG. 3) is assigned to facilitate effectuation of communications. In other implementations, the mobile station 12 is offered in a conventionally-defined system.

Here, the mobile station is shown to include a multi-tasking coordinator 72. The multi-tasking coordinator decouples data services, here represented by a first data service 74 and a second data service 76 both from each other and from knowledge of the available network resources, here represented by the block 78, and available radio resources, here represented by the blocks 82 and 84. As shown, the network resources 78 include, for instance, service option connection and routing table setups.

In conventional manner, resources, such as the resources 78–84, are released when timers expire in manners analogous to packet data contact disconnects in GPRS (general packet radio services). Timer values are set according to QoS (quality of service) requirements. The release of such resources is indicated at the network infrastructure and indication of such release is provided to the mobile station 12 by way of, for example, the forward flow channel 44 shown in FIG. 3. Such indications can, alternately, be provided to the mobile station by way of an IS-95 forward paging channel, here referred to as a common packet control channel (CPCC). In the exemplary implementation, the mobile station 12 need not acknowledge such network-originated, resource-release messages.

The multi-tasking coordinator 72 is maintained in synchronization with the network infrastructure with respect to the allocated resources for the effectuation of the data services 74 and 76 by way of periodic broadcast of a resource configuration field in a status message broadcast over the common packet control channel (CPCC). The resource configuration field gives the status, amongst other things, of the service options, PPP, active set existence, RF channel allocations, and an indication of the manner in which the RF channels allocated to effectuate the data service are to be used, viz., whether the channels are to be used or observed in a slotted mode.

The multi-tasking coordinator 72 receives indications of acceptable bit and bandwidth combinations and acceptable bit error rates (BERs) of the respective data services 74 and 76. Responsive to such requirements, the multi-tasking coordinator 72 requests a pool of one or more trunks, i.e., the radio channels 82 and 84 of an appropriate size to satisfy the collective requirements of all the data services, here the data services 74 and 76. The request made by the multi-tasking coordinator, in one implementation is statistically-based, and may also be a function of the current loading of the communication system.

An indication of the current loading of the communication system is, in one implementation, indicated over the CPCC by a cost-per-bit-per-delay field in the status message. Responsive to the user's profile of which the multitasking coordinator 72 is cognizant and the cost-per-bit-per-delay field, determinations are made as to whether the multitasking coordinator requests allocation of resources to perform a particular communication service. This field would increase in significance as the availability of resources available within the system becomes scarce. And, a user profile can be indexed to determine whether the data services can be effectuated based upon the user profile.

In the implementation shown in FIG. 1, the data services 74 and 76 are not aware of the state of the multiplexing layer 88. The data services also do not know what resources 78–84 are available. The multiplexing layer 88 maps received service requests, generated by the data services 74 and 76, together with outstanding resources which are available, and sends the data to effectuate the date services 74 and 76 to the extent that the resources are available. Delays encountered by the multiplexing layer 88 are monitored by the multi-tasking coordinator. If delays reach values which are greater than expected for the bandwidth obtained by the multi-tasking coordinator, the coordinator requests additional channel resources, depending upon the user profile.

In one implementation the multi-tasking coordinator communicates in a pure two-tier, MS-network by way of a dedicated control channel when at least one of the data services 74 or 76 is active or recently active. If none of the services 74 or 76 are sending or receiving data, the multi-tasking coordinator 72 is merely apprised of network activity by monitoring the CPCC.

When the data transaction is a mobile station originated transaction, initial trunk requests sent from the mobile station to the network infrastructure using an aloha method, such as that defined in the IS-95 standard relating to access channels. In another implementation initial requests are made by use of the always assigned reverse flow channel 34 shown in FIG. 3.

Thereby, an embodiment of the present invention provides a multi-tasking entity which examines the delay and throughput needs of all the active or recently active services at a mobile station-network connection and requests channel resources according to those needs and also a mobile station user profile. A common forward channel, the CPCC, is used to allocate and release the communication channels, as well as to provide indications of system loading and cost information and mobile station-specific, instantaneous allocation of resources. The implementation shown in FIG. 4 also provides a layering scheme which separates instantaneous network routing and channel information from data services yet provides the data services to permit their effectuation at requested levels of performance in terms of delay, throughput, and costs. This separates the data bearers from the application, which, therefore, forms an extensible system.

Figure 5:
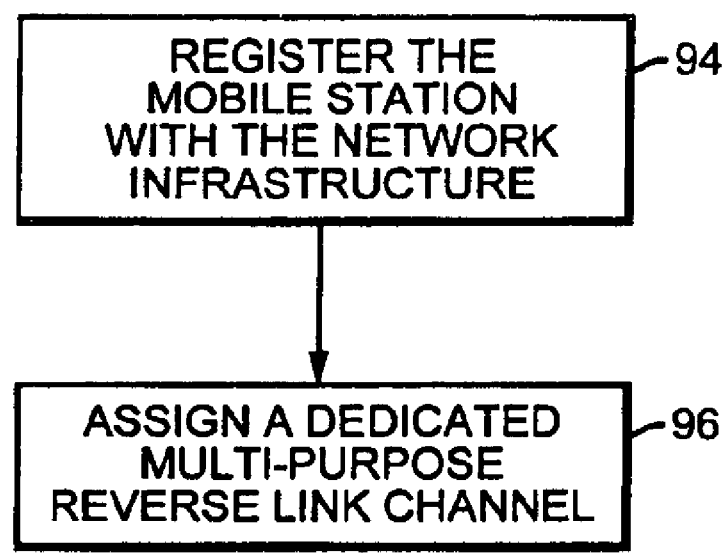
FIG. 5 illustrates a method flow diagram listing the method steps of the method of operation of an embodiment of the present invention.

FIG. 5 illustrates a method, shown generally at 92, of an embodiment of the present invention. The method facilitates communication of packet data between a mobile station and network infrastructure of the radio communication system. First, and as indicated by the block 94, the mobile station registers with the network infrastructure at least when the mobile station is initially positioned in a selected registration zone defined in the radio communication system.

Then, and as indicated by the block 96, a dedicated, multi-purpose, reverse link channel is assigned upon which to at least communicate mobile station-generated information to the network infrastructure.

The previous descriptions are of preferred examples for implementing the invention, and the scope of the invention should not necessarily be limited by this description. The scope of the present invention is defined by the following claims:

What I claim is:

1. A method for facilitating communication of packet data between a mobile station and network infrastructure of a radio communication system, said method comprising:

registering the mobile station with the network infrastructure at least when the mobile station is initially positioned in a selected registration zone defined in the radio communication system;

assigning, responsive to registration during said operation of registering, a dedicated, physical-layer, multi-purpose, reverse link channel upon which at least to communicate mobile station-generated information to the network infrastructure, and continuously maintaining the dedicated, physical-layer, multi-purpose reverse link channel assigned during said operation of assigning to permit reverse flow communications by the mobile station to the network infrastructure at any time, the reverse flow communications available on the dedicated, physical-layer, multi-purpose reverse link channel including any of packet data, a pilot signal that carries registration messages, and control messages, and the channel permitting communication of data when the mobile station is in any of an active state, an intermediate state, and a dormant state.

2. The method of claim 1 wherein the selected radio communication system defines a plurality of registration zones and wherein said operation of registering comprises registering the mobile station each time the mobile station is positioned in a different one of the registration zones.

3. The method of claim 1 comprising the additional operation of transmitting the packet data from the mobile station to the network infrastructure upon the dedicated, physical-layer, multi-purpose, reverse link channel assigned during said operation of assigning.

4. The method of claim 1 wherein the dedicated, physical-layer, multipurpose, reverse-link channel is assigned further upon which to communicate the pilot signal, wherein the mobile station-generated information comprises the pilot signal, and wherein said method comprises the additional operation of transmitting the pilot signal from the mobile station to the network infrastructure upon the dedicated, physical-layer, multi-purpose, reverse-link channel.

5. The method of claim 1 wherein the dedicated, multi-purpose reverse-link channel is assigned further upon which to communicate the control messages, wherein the mobile station-generated information comprises control messages, and wherein said method comprises the additional operation of transmitting the control messages from the mobile station to the network infrastructure upon the dedicated, multi-purpose, reverse-link channel.

6. The method of claim 1 comprising the additional operation of assigning a point-to-multipoint forward-link channel upon which at least to communicate control messages from the network infrastructure to the mobile station.

7. The method of claim 6 wherein the control messages comprise power control commands for controlling power levels at which at least the packet data communicated on the dedicated, physical-layer, multi-purpose, reverse-link channel is transmitted.

8. The method of claim 1 comprising the additional operation of determining a location of the mobile station responsive to signals communicated upon the dedicated physical layer, multi-purpose, reverse-link channel.

9. The method of claim 1 wherein the radio communication system comprises a CDMA communication system and wherein the dedicated, physical-layer, multi-purpose, reverse-link channel comprises a privately-spread channel.

10. The method of claim 1 wherein the packet data is communicated to effectuate selectively a first data service and at least a second data service and wherein said method further comprises the operation of coordinating communication of packet data to effectuate the first and at least second data services, respectively, by way of the dedicated, physical-layer, multi-purpose, reverse-link channel.

11. The method of claim 10 wherein said operation of coordinating comprises examining communication requirements to effectuate the first and the at least second data services.

12. The method of claim 11 wherein said operation of coordinating is performed at the network infrastructure, said operation of coordinating further comprising communicating the communication requirements from the mobile station to the network infrastructure upon a dedicated control channel.

13. The method of claim 12 comprising the additional operation of allocating channel capacity responsive to examinations performed during said operation of examining.

14. The method of claim 13 comprising the additional operation of communicating allocations of the channel capacity to the mobile station on a common forward channel.

15. The method of claim 10 wherein said operation of coordinating is further operable responsive to cost information associated with at least one of the first data service and the at least the second data service.

16. The method of claim 1 wherein said method comprising the additional operation of:

determining characteristics of data to be communicated between the mobile station and the network infrastructure;

selecting, responsive to the characteristics of the data determined during said operation of determining, in which state of the active state, the dormant state, and the intermediate state to operate the mobile station to communicate the data.

17. Apparatus for a radio communication system permitting communication of packet data between a mobile station and network infrastructure of the radio communication system, said apparatus for facilitating communication of the packet data from the mobile station to the network infrastructure, comprises:

a registry at which to register the mobile station with the network infrastructure at least when the mobile station is initially positioned in a selected registration zone defined in the radio communication system; and a channel assignor, operable responsive to registration of the mobile station at said registry, for assigning a dedicated, physical-layer, multi-purpose, reverse-link channel upon which at least to communicate packet data at the mobile station-generated information to the network infrastructure, the channel assigned by said channel assignor continuously maintained to permit reverse flow communications by the mobile station to the network infrastructure at any time, and the reverse flow communications available on the dedicated, physical-layer, multi-purpose reverse link channel including any of packet data, a pilot signal that carries registration messages, and control messages, and the channel permitting communication of data when the mobile station is in any of an active state, an intermediate state, and a dormant state.

18. The apparatus of claim 17 said apparatus further comprises:

a determiner coupled to receive indications of characteristics of data to be communicated between the mobile station and the network infrastructure; and a selector, operable responsive to determinations by said determiner, said selector for selecting in which state of the active state, the intermediate state, and the dormant state in which to operate the mobile station to communicate the data.

19. A method for facilitating communication of packet data between a mobile station and network infrastructure of a radio communication system, said method comprising:

registering the mobile station with the network infrastructure at least when the mobile station is initially positioned in a selected registration zone defined in the radio communication system; and assigning, responsive to registration during said operation of registering, a dedicated, physical-layer, multi-purpose, reverse link channel upon which at least to communicate mobile station-generated information to the network infrastructure, the reverse flow communications available on the dedicated, physical-layer, multi-purpose reverse link channel including any of packet data, a pilot signal that carries registration messages, and control messages, and the channel permitting communication of data when the mobile station is in any of an active state, an intermediate state, and a dormant state;

assigning a point-to-multipoint forward-link channel upon which at least to communicate control messages from the network infrastructure to the mobile station, the control messages comprising power control commands for controlling power levels at which at least the mobile station-generated information communicated on the dedicated, multi-purpose reverse-link channel is transmitted.

* * * * *